United States Patent
Zhai et al.

(10) Patent No.: US 9,729,818 B2
(45) Date of Patent: Aug. 8, 2017

(54) ADAPTIVE POST-PROCESSING FOR MOBILE VIDEO CALLING SYSTEM

(71) Applicant: Apple Inc., Cupertino, CA (US)

(72) Inventors: Jiefu Zhai, San Jose, CA (US); Chris Y. Chung, Sunnyvale, CA (US); Xiaosong Zhou, Campbell, CA (US); Hsi-Jung Wu, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/043,448

(22) Filed: Feb. 12, 2016

(65) Prior Publication Data

US 2016/0173817 A1 Jun. 16, 2016

Related U.S. Application Data

(63) Continuation of application No. 14/082,852, filed on Nov. 18, 2013, now Pat. No. 9,264,661.

(60) Provisional application No. 61/832,429, filed on Jun. 7, 2013.

(51) Int. Cl.
*H04N 7/14* (2006.01)
*H04N 19/117* (2014.01)

(52) U.S. Cl.
CPC .......... *H04N 7/141* (2013.01); *H04N 19/117* (2014.11)

(58) Field of Classification Search
CPC ......... H04N 7/141; H04N 7/14; H04N 19/117
USPC ........................................ 348/14.01–14.16
See application file for complete search history.

(56) References Cited

U.S. PATENT DOCUMENTS

| | | | |
|---|---|---|---|
| 8,659,703 B1* | 2/2014 | Candelore | G08C 17/02 340/686.6 |
| 2006/0110062 A1* | 5/2006 | Chiang | H04N 19/117 382/260 |
| 2006/0133689 A1 | 6/2006 | Andersson et al. | |
| 2006/0192847 A1 | 8/2006 | Watanabe | |
| 2007/0178944 A1 | 8/2007 | Mitsuru et al. | |
| 2009/0316793 A1 | 12/2009 | Yang et al. | |
| 2010/0080287 A1 | 4/2010 | Ali | |
| 2011/0032329 A1 | 2/2011 | Bauza et al. | |
| 2011/0032338 A1 | 2/2011 | Raveendran et al. | |
| 2011/0286516 A1* | 11/2011 | Lim | H04N 7/17318 375/240.03 |
| 2012/0154517 A1* | 6/2012 | Um | H04N 13/02 348/14.16 |
| 2013/0028531 A1* | 1/2013 | Sato | H04N 19/60 382/233 |

FOREIGN PATENT DOCUMENTS

JP 2000209589 A 7/2000

OTHER PUBLICATIONS

US Office Action issued Apr. 28, 2015, in U.S. Appl. No. 14/082,852.

\* cited by examiner

*Primary Examiner* — Melur Ramakrishnaiah
(74) *Attorney, Agent, or Firm* — Baker Hostetler LLP; Robert L. Hails

(57) ABSTRACT

A system may include a receiver, a decoder, a post-processor, and a controller. The receiver may receive encoded video data. The decoder may decode the encoded video data. The post-processor may perform post-processing on frames of decoded video sequence from the decoder. The controller may adjust post-processing of a current frame, based upon at least one condition parameters detected at the system.

20 Claims, 5 Drawing Sheets

200

300

400

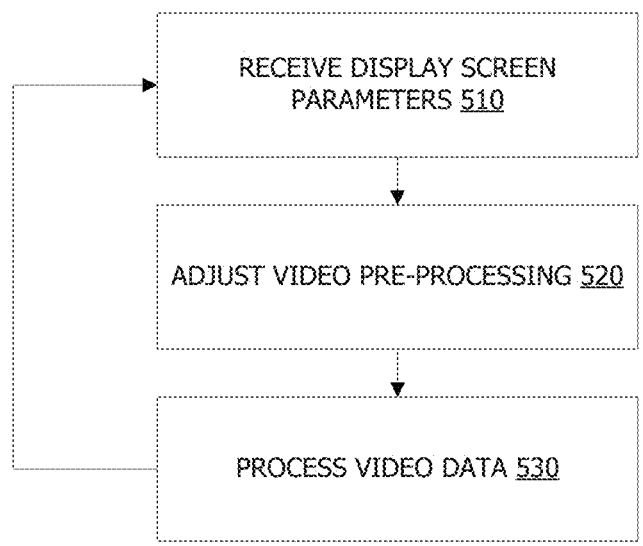

ADAPTIVE POST-PROCESSING FOR MOBILE VIDEO CALLING SYSTEM

CROSS-REFERENCE TO RELATED APPLICATIONS

This application claims benefit under 35 U.S.C. §119(e) of U.S. Provisional Application Ser. No. 61/832,429, filed Jun. 7, 2013, which is incorporated herein by reference in its entirety.

BACKGROUND

In communication systems with video displays, a video post-processing may be applied after decoding encoded video data to improve visual quality of video image. Such post-processing, for example by filtering, may help remove visual artifacts caused by video coding and/or compression. A typical filter's strength may be tuned to obtain good trade-off, in eliminating most visual artifacts while not blurring video frames too much.

Fixed filtering strength or adjusted filtering strength based upon video compression may be used for the post-processing. However, such level of post-processing may be insufficient.

Thus, there may be a need for an improved way of processing video data to improve visual quality more adaptively.

BRIEF DESCRIPTION OF THE DRAWINGS

FIG. 5 illustrates a coding method according to an embodiment of the present disclosure.

DETAILED DESCRIPTION

Figure 1:
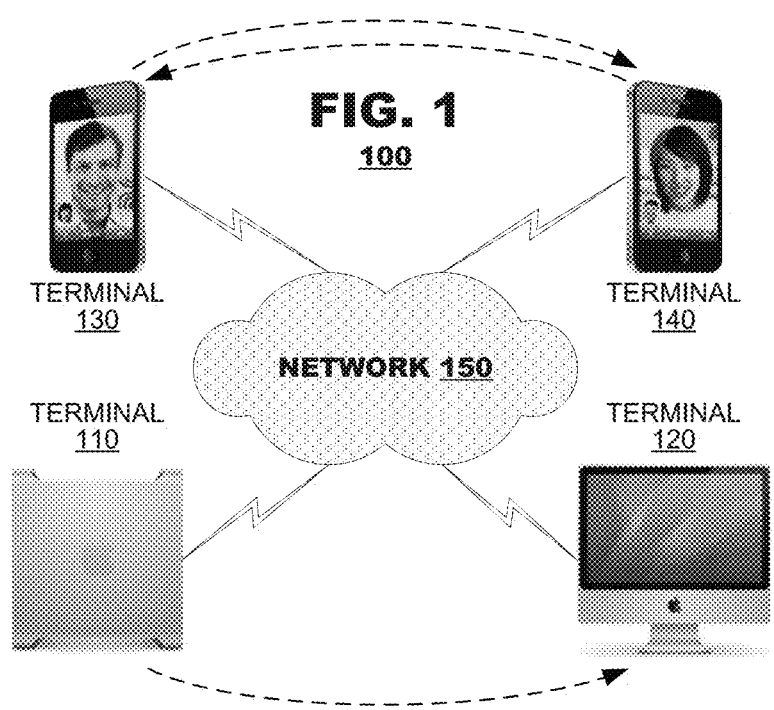
FIG. 1 illustrates a communication system according to an embodiment of the present disclosure.

FIG. 1 illustrates a simplified block diagram of a communication system 100 according to an embodiment of the present invention. The system 100 may include at least two terminals 110-120 interconnected via a network 150. For unidirectional transmission of data, a first terminal 110 may code video data at a local location for transmission to the other terminal 120 via the network 150. The second terminal 120 may receive the coded video data of the other terminal from the network 150, decode the coded data and display the recovered video data. Unidirectional data transmission may be common in media serving applications and the like.

FIG. 1 illustrates a second pair of terminals 130, 140 provided to support bidirectional transmission of coded video that may occur, for example, during videoconferencing. For bidirectional transmission of data, each terminal 130, 140 may code video data captured at a local location for transmission to the other terminal via the network 150. Each terminal 130, 140 also may receive the coded video data transmitted by the other terminal, may decode the coded data and may display the recovered video data at a local display device.

In FIG. 1, the terminals 110-140 may be illustrated as servers, personal computers and smart phones but the principles of the present invention may be not so limited. Embodiments of the present invention find application with laptop computers, tablet computers, media players and/or dedicated video conferencing equipment. The network 150 represents any number of networks that convey coded video data among the terminals 110-140, including for example wireline and/or wireless communication networks. The communication network 150 may exchange data in circuit-switched and/or packet-switched channels. Representative networks include telecommunications networks, local area networks, wide area networks and/or the Internet. For the purposes of the present discussion, the architecture and topology of the network 150 may be immaterial to the operation of the present invention unless explained hereinbelow.

Figure 2:
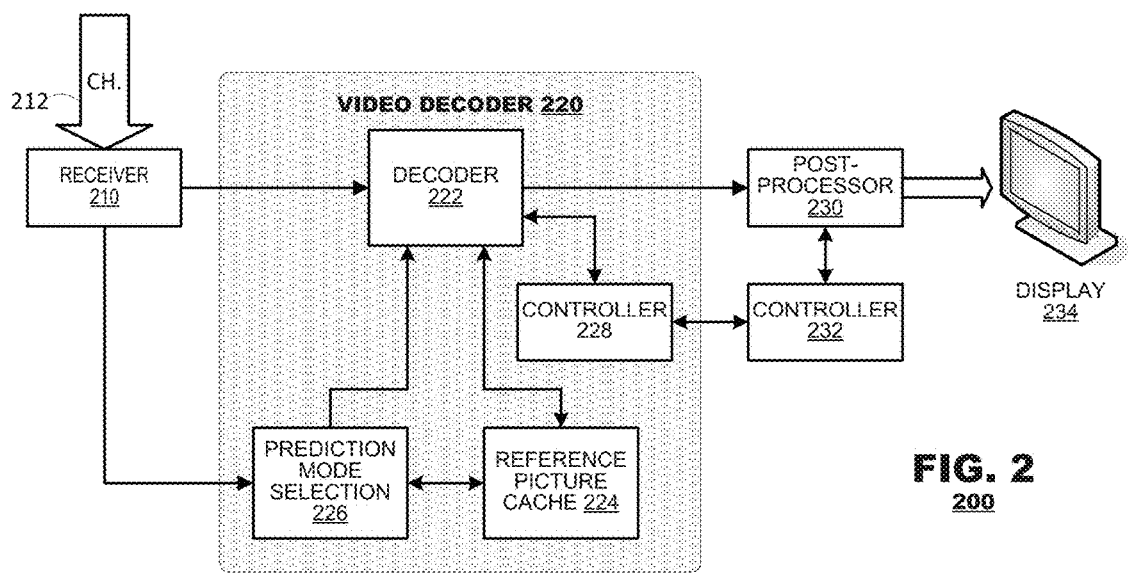
FIG. 2 illustrates a decoding system according to an embodiment of the present disclosure.

FIG. 2 may be a functional block diagram of a video decoding system 200 according to an embodiment of the present invention.

The video decoding system 200 may include a receiver 210 that receives encoded video data, a video decoder 220, a post-processor 230, a controller 232 to manage operation of the system 200 and a display 234 to display the decoded video data. The video decoder 220 may decode video sequence received. The post-processor 230 may perform post-processing on frames of decoded video sequence. The controller 232 may adjust the post-processing of a current frame by the post-processor 230, based upon one or more of condition parameters detected by the system 200.

The receiver 210 may receive video to be decoded by the system 200. The encoded video data may be received from a channel 212. The receiver 210 may receive the encoded video data with other data, for example, coded audio data and/or ancillary data streams. The receiver 210 may separate the encoded video data from the other data.

The video decoder 220 may perform decoding operation on the video sequence received from the receiver 210. The video decoder 220 may include a decoder 222, a reference picture cache 224, and a prediction mode selection 226 operating under control of controller 228. The decoder 222 may reconstruct coded video data received from the receiver 210 with reference to reference pictures stored in the reference picture cache 224. The decoder 222 may output reconstructed video data to the post-processor 230, which may perform additional operations on the reconstructed video data to condition it for display. Reconstructed video data of reference frames also may be stored to the reference picture cache 224 for use during decoding of subsequently received coded video data.

Figure 3:
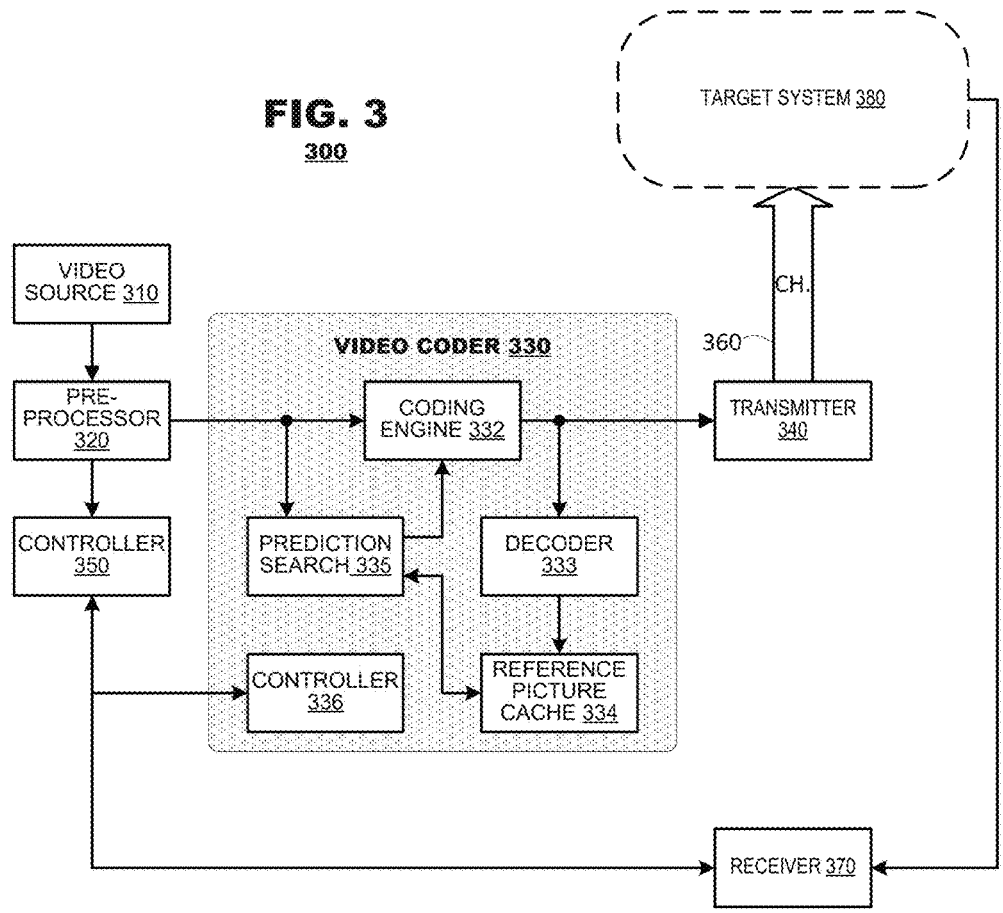
FIG. 3 illustrates a coding system according to an embodiment of the present disclosure.

The decoder 222 may perform decoding operations that invert coding operations performed by the video coder 330 (shown in FIG. 3). The decoder 222 may perform entropy decoding, dequantization and transform decoding to generate recovered pixel block data. Quantization/dequantization operations may be lossy processes and, therefore, the recovered pixel block data likely will be a replica of the source pixel blocks that were coded by the video coder 330 (shown in FIG. 3) but may include some error. For pixel blocks coded predictively, the transform decoding may generate residual data; the decoder 222 may use motion vectors associated with the pixel blocks to retrieve predicted pixel blocks from the reference picture cache 224 to be combined with the prediction residuals. The prediction mode selector 226 may identify a temporal prediction mode being used for each pixelblock of an encoded frame being decoded and request the needed data for the decoding to be read from the reference picture cache 224. Reconstructed pixel blocks may be reassembled into frames and output to the post-processor 230.

The post-processor 230 may perform video processing to condition the recovered video data for rendering, commonly at a display 234. Typical post-processing operations may include applying deblocking filters, edge detection filters, ringing filters and the like. The post-processor 230 may output recovered video sequence for rendering on the display 234 or, optionally, stored to memory (not shown) for later retrieval and display. The controller 232 may manage operation of the system 200.

An exemplary post-processing operation may be described as follows. A square pixel region in the decoded image may be defined, and an orthogonal transform (such as discrete cosine transform (DCT)) may be applied to obtain transformed coefficients. A hard thresholding may be performed followed by inverse transform, a filtered version of the square pixel region may be obtained. Hard thresholding may be defined as a function or operation that may set a coefficient to zero if the coefficient's absolute value may be lower than certain threshold value.

For multiple overlapped pixel regions taken from the decoded image, the above operation may be repeated, to obtain filtered version of multiple pixel regions. The filtered pixel regions may be aggregated together by weighted averaging to generate an overall filtered image.

In the above post processing filtering operation, the threshold value used in the hard thresholding step determines the strength of the filter: the higher the threshold, the stronger filtering effect on the resulting image.

The perception of video quality may depend on many factors associated with the image capturing, the coding, the transmission, the reception, the decoding, and the playback of the video, for example: resolution and settings used for compression, display size, display brightness, display to user distance, user viewing angle relative to display, and ambient light, existing filtering settings, etc. Additionally, power consumption in video coding and decoding systems may be a concern. For example, when post processing does not provide a significant visual difference, post-processing filter may be turned off.

View random access (VRA) pictures or access units may be coded into a bitstream. VRA coding enable allows for the decoding of a subset of the views present in the bitstream. The views selected to be accessible in VRA pictures may be alternated in successive VRA pictures, such that all views may be gradually reconstructed when two or more VRA pictures have been decoded.

In a mobile communication system, settings of the post-processing (such as the threshold value) may be adaptively in various ways. For mobile communication system that uses VRA, the threshold value of the filter may be adjusted to relatively higher for low VRA resolutions and relatively lower for high VRA resolutions. With low VRA resolution, visual artifacts due to coding or compression may be scaled up relatively in visual field of the decoded image, and thus become more visible to human eyes. Therefore, stronger filtering at low VRA resolution to remove visual artifacts may be needed to suppress these artifacts, for example to smooth out pixels with too much color contrast, even at the cost of removing some textures.

Screen size, display window size, screen resolution and viewing distance may be condition parameters for adjusting the post-processing (for example for adjusting a filter threshold value).

If the user is further away from the screen 234, he/she may be less likely to perceive the visual artifacts due to coding, therefore a lower filter threshold value in post processing may be applied. The ability of human eyes to perceive visual artifacts due to coding may depend on the "pixel per degree (PPD)", which may be influenced by multiple factors, such as screen size, screen resolution, and the distance from the screen 234 to the viewing user. The filter threshold value may be set in reverse proportion to PPD, as it may be less likely to see visual artifacts due to coding if more pixels may be packed into a small space (more PPD), and thus a weaker filtering may be needed.

An exemplary filter threshold value may be represented as T=f(x).

If S, R, and D represent the screen physical size, the screen resolution, and the viewing distance respectively, an exemplary filter threshold value may be represented by a monotone increasing function that may be tuned:

$$T \propto f\left(\frac{S}{B+D}\right) \propto a*\left(\frac{S}{B+D}\right)+b,$$

where a and b may be parameters used for tuning the adaptive filter threshold value.

The system 200 may detect the above condition factors. The screen physical size may be specified as a predefined hardware parameter stored in a memory in the system 200. The screen resolution may be a predefined hardware parameter, or an actual video/image screen solution defined by the video stream data, or a combination of both.

The viewing distance may represent the approximate distance between the viewing user's eyes and the screen 234 of the system 200. The viewing distance may be determined or estimated by the system 200 via various different processes.

For example, during video conferencing, a user terminal may be receiving and displaying a first video from a different user terminal, while capturing and transmitting a second video. In such a case, the user terminal may use the captured image of the second video to perform real time image processing (for example, face recognition), to determine or estimate the viewing distance, based upon the size of the recognized face of the user in the captured real time video image. The viewing distance, as determined real time from the second video, may be used in real time to adjust the post-processing of the first video to be displayed on the user terminal.

Various different image processing or machine vision systems and methods may be used to determine the viewing distance. For example, the distance between the centers of the user's eyes in the captured image may be considered to be approximately inversely proportional to the viewing distance of the screen 234 to the user. That is, closer the user's eyes are to each other in the image, the greater the viewing distance. Alternatively, other human facial geometries may be used to estimate the viewing distance.

Additionally, the system 200 may determine the viewing distance, by using additional sensor data from sensors such as accelerometer, global position satellite (GPS), echo location sensor, electric field sensor, magnetic field sensor, depth camera, stereoscopic camera, light-field camera, etc.

Other condition parameters affect the adaptive filter threshold value may include screen brightness and ambient light brightness at the display terminal. If the display terminal (such as a mobile device) is under direct and bright sun light, for example, it may be relative difficult for the viewing user to see fine details in the image, including visual artifacts due to coding, as compared to when the display terminal is displaying the image in a dark room. Thus, less filtering may be needed if the ambient light brightness is relatively high. On the other hand, if the screen brightness is relatively high, visual artifacts may be more noticeable, and thus more filtering may be needed.

If A and B represent the ambient light brightness and the screen brightness respectively, an exemplary filter threshold value may be represented by a monotone increasing function that may be tuned:

$$T \propto f\left(\frac{S}{B+D}\right) \propto a * \left(\frac{S}{B+D}\right) + b,$$

where c and d may be parameters used for tuning the adaptive filter threshold value.

The ambient light brightness and the screen brightness may be determined or estimated by the system 200 via various ways.

For example, the ambient light brightness may be estimated from detected brightness from optical sensors in the system 200, for example, a camera used to capture video images during a video conference, or one or more optical switch, optical resistor, optical transistors designed to generate signals varying intensity based upon ambient light intensity.

A camera may capture the video image of the user, and the system 200 may determine the ambient light brightness from the pixel brightness of the captured video image of the user. The system 200 may specifically determine ambient light brightness from only some portions of the captured video image of the user. For example, the background scene behind the user may be extremely bright, while the user's face or eyes may be positioned in a shadow. In such a case, the user may be viewing the display from a shadow, and from his/her point of view, the ambient light brightness may be considered to be relatively low. Thus, the system 200 may determine that only the pixel brightness of the user's face in the image, particularly near the user's eyes, is the relevant portion of the image to use for determining the relevant ambient light brightness.

Additionally, the system 200 may determine the ambient light brightness based upon other ambient light related factors calculated or estimated from the captured image of the user's face, such as ambient light angle relative to the viewing angle. For example, a uni-directional ambient light shining perpendicular to the user's viewing angle would not significantly interfere with the user's perception of the displayed image on the screen 234. Thus, if the system 200 determines from the captured image of the user's face that the ambient light is mostly from a direction perpendicular to the viewing direction, then the system 200 may adjust post-processing to be relatively high, as compared to when the ambient light is determined to be mostly omni-directional (such as in natural sun light or under a flood light).

Furthermore, the system 200 may determine the ambient light brightness partly based upon the amount of light shining on or near the screen 234. If the user is positioned in a relatively dark location, but there is a bright light shining directly on the screen 234 itself, then the user may perceive a large amount of ambient light reflected from the surface of the screen 234. In such a case, the system may determine the ambient light brightness to be relatively high, and adjust post-processing to be relatively low, as visual artifacts would not be very noticeable under such lighting conditions.

The system 200 may determine the screen brightness, i.e. the overall brightness of light from the displayed image on screen 234, via various ways. For example, the system 200 may detect the hardware type of the screen 234 (liquid crystal display (LCD), light emitting diode (LED), organic light emitting diode (OLED), etc.), driving signals (for example, for backlighting) of the screen 234, and etc., to estimate or calculate the current screen brightness of screen 234.

The exemplary adaptive filter threshold value function may be saved as a plurality of pre-calculated look-up values in a look-up table indexed according to multiple condition parameters such as S, R, and D above. Multiple adaptive filter threshold value functions may be saved in the look-up table as different pre-tuned post-processing "policies" or "profiles", such as for "movie quality" with more video smoothing, etc.

Additionally, the screen 234 at the display terminal may not be facing the viewing user directly, i.e. where the screen surface is not oriented perpendicular to the viewing direction, or the screen surface is tilted at some viewing angle relative to the viewing user. In such a condition, more pixels may be compacted into smaller viewing field, i.e. more PPD, visual artifacts may be less noticeable, and thus less filtering may be needed.

In the above example for the viewing angle, the post-processing (for example by filtering) may be adapted or adjusted according to the tilt direction of the view angle. Specifically for example, if the screen 234 is tilted in the horizontal direction relative to the viewing user, (for example, the screen 234 is turned toward to the right of the user), PPD may be compacted only in one specific dimension (for example here, the x-dimension), while the PPD may be unchanged in the direction perpendicular to the one specific dimension (for example here, the y-dimension). In such a case, visual artifacts may be less noticeable in the x-dimension, but more noticeable in the y-dimension. Thus, it may be desirable to adjust the post-processing to be relatively less in the one specific dimension (x-dimension), and/or relatively more in the direction perpendicular to the one specific dimension (y-dimension).

The system 200 may determine the viewing angle via various ways.

For example, the system 200 may use a camera to capture an image of the user's face, and estimate the viewing angle based upon the position and orientation of the user's face in the captured image.

Additionally, the system 200 may determine the viewing angle, by using additional sensor data from sensors such as accelerometer, global position satellite (GPS), echo location sensor, electric field sensor, magnetic field sensor, etc.

The viewing angle may also be estimated to determine a target image region, which the user may have focused his/her viewing attention to. The system 200 may use optical sensors, such as cameras, to calculate which portion of the screen 234 that the user may be focusing his/her viewing attention to in real time. The system 200 may selectively adjust post-processing to be relatively high for the target image region of the user's attention, thus increasing visual quality and removing visual artifacts in the image region of the user's attention, while reducing post-processing for image regions outside of the user's attention. In real time, the user's attention may wander over different regions of the image. The system 200 may record history of user's focused locations on the screen 234, and reduce post-processing for image regions having history of receiving little user viewing attentions.

Furthermore, the display terminal itself may contain components with existing image processing, such as hardware image filtering. In such a case, it may be desirable to adjust the post-processing in the decoding system, by accounting for the existing image processing settings, so to avoid duplicative and non-useful image processing. If the display terminal contains components with existing image processing, the decoding system in the display terminal may determine the existing image processing settings and adjust the post-processing to remove any duplicative or superseding or similar image post-processing.

The video decoder 220 may perform decoding operations according to a predetermined protocol, such as H.263, H.264, MPEG-2, HEVC. In its operation, the video decoder 220 may perform various decoding operations, including predictive decoding operations that exploit temporal and spatial redundancies in the encoded video sequence. The coded video data, therefore, may conform to a syntax specified by the protocol being used.

In an embodiment, the receiver 210 may receive additional data with the encoded video. The additional data may include collected statistics on the video frames or details on operations performed by the pre-processor 320 (shown in FIG. 3). The additional data may be received via a channel established by the governing protocol for out-of-band data. For example, the receiver 210 may receive the additional data via supplemental enhancement information (SEI) channel and/or video usability information (VUI) channel. Alternatively, the additional data may be included as part of the encoded video frames. The additional data may be used by the video decoder 220 and/or the post-processor 230 to properly decode the data and/or to more accurately reconstruct the original video data.

FIG. 3 may be a functional block diagram of a video coding system 300 according to an embodiment of the present invention.

The system 300 may include a video source 310 that provides video data to be coded by the system 300, a pre-processor 320, a video coder 330, a transmitter 340 and a controller 350 to manage operation of the system 300. The controller 350 may control the pre-processor 320 to pre-process image information from the video source 310, base upon one or more condition parameters. The video coder 330 may code and compress the pre-processed image information into video data. The transmitter 340 may transmit the video data.

The video source 310 may provide video to be coded by the system 300. In a media serving system, the video source 310 may be a storage device storing previously prepared video. In a videoconferencing system, the video source 310 may be a camera that captures local image information as a video sequence. Video data typically may be provided as a plurality of individual frames that impart motion when viewed in sequence. The frames themselves typically may be organized as a spatial array of pixels.

The pre-processor 320 may perform various analytical and signal conditioning operations on video data. The pre-processor 320 may parse input frames into color components (for example, luminance and chrominance components) and also may parse the frames into pixel blocks, spatial arrays of pixel data, which may form the basis of further coding. The pre-processor 320 also may apply various filtering operations to the frame data to improve efficiency of coding operations applied by a video coder 330.

According to an embodiment, the system 300 may pre-process and/or compress the image information for frames of the video sequence in real time, based upon one or more condition parameters. The condition parameters may be received (via receiver 370) or determined in real time from a target system 380 (not necessarily included in system 300) which may be receiving the transmitted video data from system 300. That is, the system 300 may preprocess and/or compress the image information captured by system 300, based upon the conditions of display operations of the target system 380, which may be decoding, postprocessing, and displaying the video sequence from system 300. In other words, the transmitting system 300 may perform pre-processing and/or compression of the image information based upon the conditions of the target system 380. The controller 350 may receive the condition parameters via receiver 370 from target system 380, and control the pre-processing of image in pre-processor 320, and/or control the compression and coding in video coder 330, based on the condition parameters. The target system 380 may include a decoding system 200 as illustrated in FIG. 2.

According to an embodiment, the condition parameters used by system 300 may include the condition parameters stated above for post-processing in system 200. The system 300 may perform pre-processing based on the condition parameters, in similar relationships of the postprocessing based on the condition parameters. By performing the pre-processing in this fashion, visual artifacts may be removed in system 300 before coding, and the decoding system 200 (in a target system 380) may reduce or remove post-processing. This may allow computation resource requirements to be shifted to the coding system 300 from the decoding system 200. Additionally, this shifting may be reversed from the coding system 300 to the decoding system 200. Moreover, a balance of shared computation resource requirements may be achieved between the coding system 300 and the decoding system 200, based upon available computation resources at each end, thus allowing the coding system 300 to pre-process and remove some of the visual artifacts, while the decoding system 200 to post-process and remove the remaining visual artifacts.

According to an embodiment, the system 300 may perform video compression based upon the condition parameters, in similar fashion as the pre-processing.

The video coder 330 may perform coding operations on the video sequence to reduce the video sequence's bit rate. The video coder 330 may include a coding engine 332, a local decoder 333, a reference picture cache 334, a predictor 335 and a controller 336. The coding engine 332 may code the input video data by exploiting temporal and spatial redundancies in the video data and may generate a datastream of coded video data, which typically has a reduced bit rate as compared to the datastream of source video data. As part of its operation, the video coder 330 may perform motion compensated predictive coding, which codes an input frame predictively with reference to one or more previously-coded frames from the video sequence that were designated as "reference frames." In this manner, the coding engine 332 codes differences between pixel blocks of an input frame and pixel blocks of reference frame(s) that may be selected as prediction reference(s) to the input frame.

The local decoder 333 may decode coded video data of frames that may be designated as reference frames. Operations of the coding engine 332 typically may be lossy processes. When the coded video data may be decoded at a video decoder (not shown in FIG. 3), the recovered video sequence typically may be a replica of the source video sequence with some errors. The local decoder 333 replicates decoding processes that will be performed by the video decoder on reference frames and may cause reconstructed reference frames to be stored in the reference picture cache 334. In this manner, the system 300 may store copies of reconstructed reference frames locally that have common content as the reconstructed reference frames that will be obtained by a far-end video decoder (absent transmission errors).

The predictor 335 may perform prediction searches for the coding engine 332. That is, for a new frame to be coded, the predictor 335 may search the reference picture cache 334 for image data that may serve as an appropriate prediction reference for the new frames. The predictor 335 may operate on a pixel block-by-pixel block basis to find appropriate prediction references. In some cases, as determined by search results obtained by the predictor 335, an input frame may have prediction references drawn from multiple frames stored in the reference picture cache 334.

The controller 336 may manage coding operations of the video coder 330, including, for example, selection of coding parameters to meet a target bit rate of coded video. Typically, video coders operate according to constraints imposed by bit rate requirements, quality requirements and/or error resiliency policies. The controller 336 may select coding parameters for frames of the video sequence in order to meet these constraints. For example, the controller 336 may assign coding modes and/or quantization parameters to frames and/or pixel blocks within frames.

The transmitter 340 may buffer coded video data to prepare it for transmission to the far-end terminal (not shown) via a communication channel 360. The transmitter 340 may merge coded video data from the video coder 330 with other data to be transmitted to the terminal, for example, coded audio data and/or ancillary data streams (sources not shown).

The controller 350 may manage operation of the system 300. During coding, the controller 350 may assign to each frame a certain frame type (either of its own accord or in cooperation with the controller 336), which may affect the coding techniques that may be applied to the respective frame. For example, frames often may be assigned as one of the following frame types:

An Intra Frame (I frame) may be one that may be coded and decoded without using any other frame in the sequence as a source of prediction.

A Predictive Frame (P frame) may be one that may be coded and decoded using earlier frames in the sequence as a source of prediction.

A Bidirectionally Predictive Frame (B frame) may be one that may be coded and decoded using both earlier and future frames in the sequence as sources of prediction.

Frames commonly may be parsed spatially into a plurality of pixel blocks (for example, blocks of 4×4, 8×8 or 16×16 pixels each) and coded on a pixel block-by-pixel block basis. Pixel blocks may be coded predictively with reference to other coded pixel blocks as determined by the coding assignment applied to the pixel blocks' respective frames. For example, pixel blocks of I frames may be coded non-predictively or they may be coded predictively with reference to pixel blocks of the same frame (spatial prediction). Pixel blocks of P frames may be coded non-predictively, via spatial prediction or via temporal prediction with reference to one previously coded reference frame. Pixel blocks of B frames may be coded non-predictively, via spatial prediction or via temporal prediction with reference to one or two previously coded reference frames.

The video coder 330 may perform coding operations according to a predetermined protocol, such as H.263, H.264, MPEG-2, HEVC. In its operation, the video coder 330 may perform various compression operations, including predictive coding operations that exploit temporal and spatial redundancies in the input video sequence. The coded video data, therefore, may conform to a syntax specified by the protocol being used.

In an embodiment, the transmitter 340 may transmit additional data with the encoded video. The additional data may include collected statistics on the video frames or details on operations performed by the pre-processor 320. The additional data may be transmitted in a channel established by the governing protocol for out-of-band data. For example, the transmitter 340 may transmit the additional data in a supplemental enhancement information (SEI) channel and/or a video usability information (VUI) channel. Alternatively, the video coder 330 may include such data as part of the encoded video frames.

Figure 4:
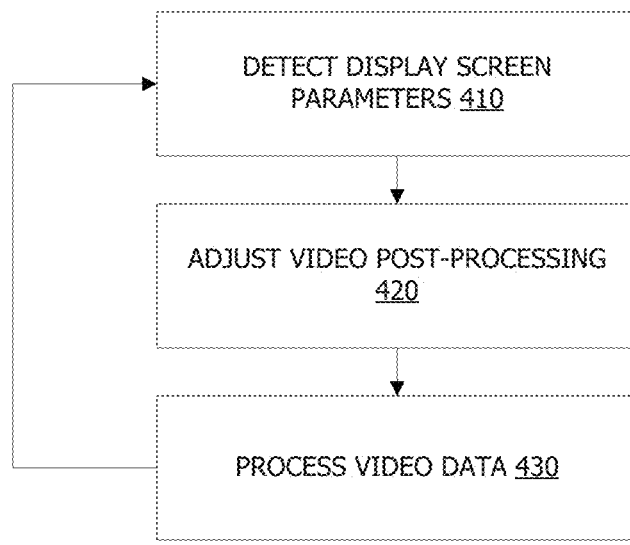
FIG. 4 illustrates a decoding method according to an embodiment of the present disclosure.

FIG. 4 illustrates a decoding method 400 according to an embodiment of the present disclosure.

At block 410, the system 200 may detect one or more condition parameters associated with the operation of a display screen.

At block 420, the controller 232 may adjust the processing of a current image frame based on the one or more condition parameters.

At block 430, the post-processor 230 may perform the processing of the current image frame.

FIG. 5 illustrates a coding method 500 according to an embodiment of the present disclosure.

At block 510, the system 300 may receive one or more condition parameters associated with the operation of a display screen of another system.

At block 520, the controller 350 may adjust the processing of a current image frame based on the one or more condition parameters.

At block 530, the pre-processor 320 may perform the processing of the current image frame.

It may be appreciated that the disclosure may be not limited to the described embodiments, and that any number of scenarios and embodiments in which conflicting appointments exist may be resolved.

Although the disclosure has been described with reference to several exemplary embodiments, it may be understood that the words that have been used may be words of description and illustration, rather than words of limitation. Changes may be made within the purview of the appended claims, as presently stated and as amended, without departing from the scope and spirit of the disclosure in its aspects. Although the disclosure has been described with reference to particular means, materials and embodiments, the disclosure may be not intended to be limited to the particulars disclosed; rather the disclosure extends to all functionally equivalent structures, methods, and uses such as may be within the scope of the appended claims.

While the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that may be capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium may include a solid-state memory such as a memory card or other package that houses one or more non-volatile read-only memories. Further, the computer-readable medium may be a random access memory or other volatile re-writable memory. Additionally, the computer-readable medium may include a magneto-optical or optical medium, such as a disk or tapes or other storage device to capture carrier wave signals such as a signal communicated over a transmission medium. Accordingly, the disclosure may be considered to include any computer-readable medium or other equivalents and successor media, in which data or instructions may be stored.

Although the present application describes specific embodiments which may be implemented as code segments in computer-readable media, it may be to be understood that dedicated hardware implementations, such as application specific integrated circuits, programmable logic arrays and other hardware devices, may be constructed to implement one or more of the embodiments described herein. Applications that may include the various embodiments set forth herein may broadly include a variety of electronic and computer systems. Accordingly, the present application may encompass software, firmware, and hardware implementations, or combinations thereof.

The present specification describes components and functions that may be implemented in particular embodiments with reference to particular standards and protocols, the disclosure may be not limited to such standards and protocols. Such standards may be periodically superseded by faster or more efficient equivalents having essentially the same functions. Accordingly, replacement standards and protocols having the same or similar functions may be considered equivalents thereof.

The illustrations of the embodiments described herein may be intended to provide a general understanding of the various embodiments. The illustrations may be not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations may be merely representational and may not be drawn to scale. Certain proportions within the illustrations may be exaggerated, while other proportions may be minimized. Accordingly, the disclosure and the figures may be to be regarded as illustrative rather than restrictive.

One or more embodiments of the disclosure may be referred to herein, individually and/or collectively, by the term "disclosure" merely for convenience and without intending to voluntarily limit the scope of this application to any particular disclosure or inventive concept. Moreover, although specific embodiments have been illustrated and described herein, it should be appreciated that any subsequent arrangement designed to achieve the same or similar purpose may be substituted for the specific embodiments shown. This disclosure may be intended to cover any and all subsequent adaptations or variations of various embodiments. Combinations of the above embodiments, and other embodiments not specifically described herein, will be apparent to those of skill in the art upon reviewing the description.

In addition, in the foregoing Detailed Description, various features may be grouped together or described in a single embodiment for the purpose of streamlining the disclosure. This disclosure may be not to be interpreted as reflecting an intention that the claimed embodiments require more features than may be expressly recited in each claim. Rather, as the following claims reflect, inventive subject matter may be directed to less than all of the features of any of the disclosed embodiments. Thus, the following claims may be incorporated into the Detailed Description, with each claim standing on its own as defining separately claimed subject matter.

The above disclosed subject matter may be to be considered illustrative, and not restrictive, and the appended claims may be intended to cover all such modifications, enhancements, and other embodiments which fall within the true spirit and scope of the present disclosure. Thus, to the maximum extent allowed by law, the scope of the present disclosure may be to be determined by the broadest permissible interpretation of the following claims and their equivalents, and shall not be restricted or limited by the foregoing detailed description.

What may be claimed:

1. A system comprising:
   a receiver receiving encoded video data;
   a decoder decoding the encoded video data;
   a post-processor filtering frames of decoded video sequence from the decoder according to filtering parameters; and
   a controller adjusting the filtering parameters of a current frame of the decoded video sequence, based upon at least one ambient operating condition detected at the system.

2. The system of claim 1, wherein the receiver separates encoded video data from ancillary data streams.

3. The system of claim 1, wherein the adjusting the filtering parameters by the post-processor comprises at least one of applying deblocking filters, applying edge detection filters, and applying ringing filters.

4. The system of claim 1, wherein the post-processor is configured to apply an inverse transform to a square pixel region following a thresholding.

5. The system of claim 4, wherein the thresholding is adjusted by the controller based upon condition parameters detected at the system.

6. The system of claim 5, wherein the condition parameters comprise at least one of a display size, a display resolution, a distance between a user and a display, a viewing angle of a user relative to surface of the display, ambient light amount, and hardware filter settings.

7. The system of claim 5, wherein the condition parameters are determined by the system via at least one of video imagining of a user, ambient light detector, accelerometer, GPS, echo location sensor, electric field sensor, magnetic field sensor, depth camera, stereoscopic camera, and light-field camera.

8. A method comprising:
   receiving, by a receiver, encoded video data;
   decoding, by a decoder, the encoded video data;
   filtering, by a post-processor, frames of decoded video sequence from the decoder according to filtering parameters; and
   adjusting, by a controller, the filtering parameters by the post-processor of a current frame of the decoded video sequence, based upon at least one ambient operating condition detected at a system.

9. The method of claim 8, wherein the receiver separates encoded video data from ancillary data streams.

10. The method of claim 8, wherein the adjusting the filtering parameters by the post-processor comprises at least one of applying deblocking filters, applying edge detection filters, and applying ringing filters.

11. The method of claim 8, wherein post-processor is configured to apply an inverse transform to a square pixel region following thresholding.

12. The method of claim 11, wherein the thresholding is adjusted by the controller based upon the condition parameters detected at the system.

13. The method of claim 12, wherein the condition parameters comprise at least one of a display size, a display resolution, a distance between a user and a display, a viewing angle of user relative to surface of the display, ambient light amount, and hardware filter settings.

14. The method of claim 12, wherein the condition parameters are determined by the system via at least one of video imagining of a user, ambient light detector, accelerometer, GPS, echo location sensor, electric field sensor, magnetic field sensor, depth camera, stereoscopic camera, and light-field camera.

15. A non-transitory computer readable medium, storing instruction codes, executable by a processor in a system to perform:
   receiving, by a receiver, encoded video data;
   decoding, by a decoder, the encoded video data;
   filtering, by a post-processor, frames of decoded video sequence from the decoder according to filtering parameters; and
   adjusting, by a controller, the filtering parameters by the post-processor of a current frame of the decoded video sequence, based upon at least one ambient operating condition detected at the system.

16. The non-transitory computer readable medium of claim 15, wherein the adjusting the filtering parameters by the post-processor comprises at least one of applying deblocking filters, applying edge detection filters, and applying ringing filters.

17. The non-transitory computer readable medium of claim 15, the post-processor is configured to apply an inverse transform to a square pixel region following thresholding.

18. The non-transitory computer readable medium of claim 17, wherein the thresholding is adjusted by the controller based upon the condition parameters detected at the system.

19. The non-transitory computer readable medium of claim 18, wherein the condition parameters comprises at least one of a display size, a display resolution, a distance between a user and a display, a viewing angle of user relative to surface of the display, ambient light amount, and hardware filter settings.

20. The non-transitory computer readable medium of claim 18, wherein the condition parameters are determined by the system via at least one of video imagining of a user, ambient light detector, accelerometer, GPS, echo location sensor, electric field sensor, magnetic field sensor, depth camera, stereoscopic camera, and light-field camera.

* * * * *